(12) United States Patent
Brock et al.

(10) Patent No.: US 7,309,754 B2
(45) Date of Patent: Dec. 18, 2007

(54) STABLE ENCAPSULANT FLUID CAPABLE OF UNDERGOING REVERSIBLE DIELS-ALDER POLYMERIZATION

(75) Inventors: Phillip Joe Brock, Sunnyvale, CA (US); Michael W. Chaw, San Jose, CA (US); Dan Dawson, San Jose, CA (US); Craig Hawker, Los Gatos, CA (US); James L. Hedrick, Pleasanton, CA (US); Teddie P. Magbitang, Sunnyvale, CA (US); Dennis McKean, Milpitas, CA (US); Robert D. Miller, San Jose, CA (US); Richard I. Palmisano, San Martin, CA (US); Willi Volksen, San Jose, CA (US)

(73) Assignee: Hitachi Global Storage Technologies Netherlands B.V. (NL)

( * ) Notice: Subject to any disclaimer, the term of this patent is extended or adjusted under 35 U.S.C. 154(b) by 462 days.

(21) Appl. No.: 10/673,052

(22) Filed: Sep. 26, 2003

(65) Prior Publication Data

US 2005/0067373 A1    Mar. 31, 2005

(51) Int. Cl.
*C08G 73/00* (2006.01)
*C08G 73/08* (2006.01)
*C08G 59/00* (2006.01)

(52) U.S. Cl. .............. 528/170; 528/310; 528/322; 528/405

(58) Field of Classification Search ........... 528/170, 528/310, 322, 405
See application file for complete search history.

(56) References Cited

U.S. PATENT DOCUMENTS

| 4,041,063 | A | * | 8/1977 | Buck ..................... 558/442 |
| 5,643,998 | A | | 7/1997 | Nakano et al. |
| 5,932,113 | A | | 8/1999 | Kurdi et al. |
| 6,106,736 | A | | 8/2000 | LeVan et al. |
| 6,271,335 | B1 | | 8/2001 | Small et al. |
| 6,337,384 | B1 | | 1/2002 | Loy et al. |
| 6,403,753 | B1 | | 6/2002 | Loy et al. |
| 2004/0266954 | A1 | * | 12/2004 | Jen et al. ............ 525/326.1 |

OTHER PUBLICATIONS

U.S. Appl. No. 10/611,317, filed Jun. 30, 2003, McKean et al.
U.S. Appl. No. 10/611,418, filed Jun. 30, 2003, McKean et al.
U.S. Appl. No. 10/611,673, filed Jun. 30, 2003, Miller et al.

* cited by examiner

*Primary Examiner*—Nathan M. Nutter
(74) *Attorney, Agent, or Firm*—Mintz, Levin, Cohn, Ferris, Glovsky and Popeo PC

(57) ABSTRACT

An encapsulant fluid is provided comprising a mixture of a diene-containing compound and a dienophilic compound. At least one of the diene-containing and the dienophilic compounds is protected so that the compounds do not substantially react with each other at room temperature. The diene-containing and the dienophilic compounds undergo a reversible Diels-Alder polymerization reaction at a polymerization temperature above room temperature to form a solid debondable polymeric encapsulant. Also provided are methods for forming slider assemblies and methods for patterning a slider surface using the encapsulant.

19 Claims, 6 Drawing Sheets

STABLE ENCAPSULANT FLUID CAPABLE OF UNDERGOING REVERSIBLE DIELS-ALDER POLYMERIZATION

TECHNICAL FIELD

The invention relates generally to a stable encapsulant fluid that undergoes Diels-Alder polymerization. The invention also relates to the formation of planarized slider assemblies from a debondable polymeric encapsulant prepared via temperature dependent, reversible Diels-Alder polymerization of the encapsulant fluid.

BACKGROUND

A magnetic storage system typically includes one or more magnetic recording disks having surfaces from which data may be read and to which data may be written by a read/write transducer or "head." The transducer is supported by an air-bearing slider that has a top surface attached to an actuator assembly via a suspension, and a bottom surface having an air-bearing design of a desired configuration to provide favorable flying height characteristics. As a disk begins to rotate, air enters the leading edge of the slider and flows in the direction of the trailing edge of the slider. The flow of air generates a positive pressure on the air-bearing surface of the slider to lift the slider above the recording surface. As the spindle motor reaches the operating RPM, the slider is maintained at a nominal flying height over the recording surface by a cushion of air. Then, as the spindle motor spins down, the flying height of the slider drops.

The manner in which a slider is manufactured can affect flying height, and a number of technologies may be employed to pattern such slider surfaces. For example, mechanical processes such as cutting or abrading have been proposed to remove material from a slider surface. Similarly, non-mechanical processes such as laser ablation, in which high intensity light is used to evaporate material from sliders, have also been proposed. Alternatively, material may be added to slider surfaces to alter their configuration to provide favorable flying height characteristics. In some instances, these technologies have been used in conjunction with photolithographic and other semiconductor processing techniques. In addition, these technologies may be adapted to pattern a plurality of air-bearing slider surfaces simultaneously and/or systematically.

Thus, several approaches have been developed to facilitate the handling of a plurality of sliders for simultaneous and/or systematic patterning of their air-bearing surfaces. For example, U.S. Pat. No. 5,932,113 to Kurdi et al. describes a method for preparing the air-bearing surface of a slider for etch patterning. The method involves applying first and second thin films comprising, respectively, first and second air-bearing surfaces, to a carrier in a manner such that the first and second thin film are separated by a recess. An adhesive film is applied over the first and second thin films adjacent to the first and second air-bearing surfaces. Then, a curable acrylate adhesive fluid is deposited in the recess and held therein by the adhesive film. Once the fluid is cured, the adhesive film is removed. The resulting slider assembly may then be patterned by etching. For example, the first and second air-bearing surfaces may be coated with an etch mask, which is then developed to allow for the patterning of the first and second air-bearing surfaces. U.S. Pat. No. 6,106,736 to LeVan et al. describes a similar method of preparing an air-bearing surface of a slider for etch patterning, except that a heated wax is employed in place of the curable acrylate adhesive.

In sum, the above-described approaches employ an encapsulant to fill the gaps between sliders to protect the edges of the sliders during patterning. However, these encapsulants suffer from a number of disadvantages. For example, the curable encapsulants described in Kurdi et al. and the waxes described in LeVan et al. often exhibit unfavorable bonding and/or debonding performance. In particular, cured epoxy materials, e.g., pure thermosetting epoxy resins, can be removed from sliders only with great difficulty and often leave significant material residue on the slider surfaces. In addition, the prior art encapsulants suffer from incompatibility with solvents that are used with the photolithographic techniques for patterning air-bearing surfaces. That is, the prior art encapsulants are mechanically unstable and are subject to solvation when exposed to fluids used in photolithographic techniques.

Recently, advances have been made with respect to slider assemblies comprising a plurality of sliders bonded by a solid debondable polymeric encapsulant. For example, silicon-containing polymeric encapsultants for forming slider assemblies are described in U.S. patent application Ser. No. 10/611,418, entitled "Sliders Bonded by a Debondable Silicon-Based Encapsulant," inventors McKean et al., filed on Jun. 30, 2003. Similarly, styrene-based polymeric encapsulants such those containing acrylate or butadiene components are described in U.S. patent application Ser. No. 10/611,673, entitled "Sliders Bonded by a Debondable Encapsulant Containing Styrene and Butadiene Polymers," inventors Miller et al., and U.S. patent application Ser. No.10/611,317, entitled "Sliders Bonded by a Debondable Encapsulant Containing Styrene and Acrylate Polymers," inventors McKean et al., each filed on Jun. 30, 2003.

Nevertheless, there exist opportunities in the art to provide alternatives to known debondable encapsulants. For example, Diels-Alder reactions between dienes and dienophiles are typically reversible, and polymeric compositions formed via Diels-Alder reactions may serve as debondable encapsulants. See, e.g., U.S. Pat. Nos. 5,643,998 to Nakano et al., 6,337,384 to Loy et al., and 6,403,7556 to Loy et al. U.S. Pat. No. 6,271,335 to Small et al. describes such an encapsulant for use in protecting electronic components. In particular, Small et al. describes a method of making a thermally-removable encapsulant by heating an encapsulant fluid comprising a mixture of a diene and a dienophile to a temperature less than about 90° C., which then react with each other to form the encapsulant. Small et al. further describes that heating the encapsulant to temperatures greater than 90° C. in a solvent will reverse the Diels-Alder reaction to facilitate encapsulant removal.

Nevertheless, known encapsulant fluids such as those of Small et al. suffer from a number of disadvantages. For example, the dienes and dienophiles contained in the encapsulant fluid of Small et al. tend to react with each other at room temperature. As a result, crosslinking occurs, thereby shortening the shelf life of the encapsulant fluid. In addition, as crosslinking occurs, the encapsulant fluid increases in viscosity to a degree that unacceptably compromises the gap filling capability of the fluid.

Accordingly, there is a need in the art to provide stable encapsulant fluids that are capable of undergoing Diels-Alder polymerization to form debondable polymeric encapsulants. Such encapsulant fluids may be used to facilitate the manufacturing of sliders and planarized slider assemblies.

SUMMARY OF THE INVENTION

An aspect of the invention pertains to a stable encapsulant fluid capable of undergoing Diels-Alder polymerization.

Another aspect of the invention pertains to a method for producing slider assemblies using the stable encapsulant fluid.

Additional aspects, advantages and novel features of the invention will be set forth in part in the description that follows, and in part will become apparent to those skilled in the art upon examination of the following, or may be learned by practice of the invention through routine experimentation.

In a first embodiment, the invention provides an encapsulant fluid comprising a mixture of a diene-containing compound and a dienophilic compound. At least one of the diene-containing and the dienophilic compounds is protected so that the compounds do not substantially react with each other at room temperature. The diene-containing and the dienophilic compounds undergo a reversible Diels-Alder polymerization reaction at a polymerization temperature above room temperature to form a solid debondable polymeric encapsulant. The encapsulant fluid is particularly suited for forming slider assemblies.

Various diene-containing and dienophilic compounds may be employed. For example, the diene-containing compounds may contain one or more cyclic groups, e.g., furan groups such as those in bis(furan), tris(furan) or tetrakis (furan). In addition, the diene-containing compound may contain silicon and/or at least one maleimide group.

In any case, either or both of the diene-containing and dienophilic compounds are protected. For example, the diene-containing compound may be protected by a protecting moiety such as a mono-ene or dienophile. For example, butadiene or isoprene may be used as a protecting moiety for the diene-containing compound, and the dienophilic compound may be protected by a capping monofuranic moiety. With a protected diene and/or dienophile, the encapsulant fluid is sufficiently stable such that the viscosity of encapsulant fluid does not substantially change for at least 24 hours at room temperature. Preferably, the viscosity of encapsulant fluid does not substantially change for at least 7 days.

In another embodiment, the invention provides a method for producing a slider assembly. A plurality of sliders each having a surface is arranged such that the surfaces are coplanar to each other. A fluid mixture of a diene-containing compound and a dienophilic compound is then dispensed to bond the sliders without contacting the coplanar slider surfaces. At least one of the diene-containing and the dienophilic compounds is protected so that the compounds do not substantially react with each other at room temperature. The fluid mixture is heated to a temperature sufficient to effect reversible Diels-Alder polymerization of the diene-containing and dienophilic compounds to form a debondable solid encapsulant from the fluid mixture, thereby producing the slider assembly.

The sliders are typically arranged in a rectilinear array on a laminate of a flexible tape and an adhesive such that slider surfaces contact the adhesive. The adhesive is selected to be resistant or impervious to solvation by the fluid mixture. Then, polymerization is typically carried out at a temperature of at least about 50° C. As a result, the slider assembly formed may have a contiguous planar surface comprised of at least one encapsulant region and containing the coplanar slider surfaces.

After the formation of the slider assembly, a resist layer may be deposited on the contiguous planar surface. By removing a portion of the resist layer to uncover a portion of a slider surface in a patternwise manner and adding material to and/or removing material from the uncovered portion of the slider surface, the surface may be patterned. Preferably, the encapsulant is mechanically stable upon exposure to any fluid employed for patterning the slider surface. In addition, patterning may be carried out photolithographically.

Once surface patterning is complete, the encapsulant may be heated, e.g., to at least about 120° C. to effect depolymerization of the polymeric encapsulant. Heating may be carried out in the presence of a solvent, a monofunctional diene, a dienophile, or a combination of any of the foregoing. These steps effect efficient debonding of the encapsulant from the sliders.

BRIEF DESCRIPTION OF THE FIGURES

FIGS. 2A-2F, collectively referred to as FIG. 2, depict an example of the inventive slider assembly as well as a method for forming the assembly. FIGS. 2A and 2B depict the arrangement of sliders in a rectilinear array on a substrate in the form of a tape having a pressure-sensitive adhesive coated on an upper surface thereof in top view.

FIGS. 3A-3E, collectively referred to as FIG. 3, depict an example of a method for photolithographically patterning an air-bearing surface of a plurality of sliders provided in the form of the slider assembly depicted in FIG. 2.

DETAILED DESCRIPTION OF THE INVENTION

Definitions and Overview

Before describing the present invention in detail, it is to be understood that this invention is not limited to processing conditions, manufacturing equipment, or the like, as such may vary. It is also to be understood that the terminology used herein is for describing particular embodiments only and is not intended to be limiting.

It must be noted that, as used in the specification and the appended claims, the singular forms "a," "an" and "the" include plural referents unless the context clearly dictates otherwise. Thus, for example, reference to "a compound" includes a single compound as well as a plurality of compounds, reference to "a resist layer" includes a single resist layer as well as a plurality of resist layers, reference to "a slider" includes a single slider as well as a plurality of sliders, and the like.

In describing and claiming the present invention, the following terminology is used in accordance with the definitions set out below.

The term "array" as used herein refers to a two-dimensional arrangement of items such as an arrangement of sliders. Arrays are generally comprised of regular, ordered items as in, for example, a rectilinear grid, parallel stripes, spirals, and the like, but non-ordered arrays may be advantageously used as well. In particular, the term "rectilinear array" as used herein refers to an array that has rows and columns of items wherein the rows and columns typically, but not necessarily, intersect each other at a ninety-degree angle. An array is distinguished from the more general term "pattern" in that patterns do not necessarily contain regular and ordered features.

The term "bond" is used herein in its ordinary sense and means to join securely. Typically, but not necessarily, "bonding" is achieved through adhesive forces. Similarly, the term "debondable" as in "debondable encapsulant" refers to an encapsulant that is susceptible to complete removal from the surfaces of items bonded thereby without damage to the items.

The term "Diels-Alder" as in "Diels-Alder reaction" is used in its ordinary sense to refer to a cycloaddition reaction in which a dienophile adds to a diene to form a 6-membered ring. An exemplary Diels-Alder reaction occurs when ethylene, a dienophile, reacts with 1,3-butadiene, a diene, to yield cyclohexene, a molecule having a six-membered ring. Typically, Diels-Alder reactions are reversible via retro-Diels-Alder reactions at temperatures that exceed the temperatures at which the Diels-Alder reactions occur.

The term "encapsulant" refers to a material suited to bond a plurality of items or to encase one or more items in a confined space. Typically, an "encapsulant" is a solid material formed from an "encapsulant fluid" that has been subjected to conditions effective for solidification to occur. For example, an "encapsulant" may be formed from the polymerization of an "encapsulant fluid" comprising a mixture of diene-containing monomers and monomers containing dienophilic groups.

The term "fluid" is generally used in its ordinary sense and refers to matter that is capable of flow. Typically, but not necessarily, a fluid contains a liquid and optionally a solid or a gas that is minimally, partially, or fully solvated, dispersed, or suspended in the liquid. For example, a fluid may be aqueous or nonaqueous in nature and may contain organic solvents and the like having polymers and/or monomers solvated therein.

"Optional" or "optionally" means that the subsequently described circumstance may or may not occur, so that the description includes instances where the circumstance occurs and instances where it does not.

The term "polymer" is used herein in its conventional sense to refer to a compound having two or more monomer units, and is intended to encompass homopolymers as well as copolymers, including, for example, graft copolymers. The term encompasses polymers of all types and is not limited to linear, branched, cyclic, or crosslinked polymers. Thus, for example, a methacrylate polymer contains at least one monomeric unit having a methacrylate structure, an acrylate polymer contains at least one monomeric unit having an acrylate structure, and an epoxy polymer contains at least one monomeric unit having an epoxide structure, modified, unmodified, reacted, or unreacted.

The term "protected" as in a "protected compound" is used herein to refer to a compound having a reactive group capable of engaging in a Diels-Alder reaction, wherein the reactive group has been modified or shielded in a manner effective to prevent the group from participating in the Diels-Alder reaction until the group becomes deprotected. For example, a dienophilic compound protected by a capping furanic moiety may not undergo a Diels-Alder reaction with a diene-containing compound until the dienophilic compound is deprotected through the release of the capping furanic moiety via a retro-Diels-Alder reaction.

The term "room temperature" is used herein in its ordinary sense and refers to a temperature of from 20 to 25° C.

The term "solid" is used in its ordinary sense and refers to items that have definite shape and volume.

The term "substantially" as in, for example, the phrase "substantially identical in geometric dimensions" refers to items having dimensions that do not deviate from each other by more than about 10%. Preferably, the difference in the dimensions is no more than 1%. Optimally the difference is no more than 0.1%. Other uses of the term "substantially" involve an analogous definition.

Slider Assembly

Figure 1:
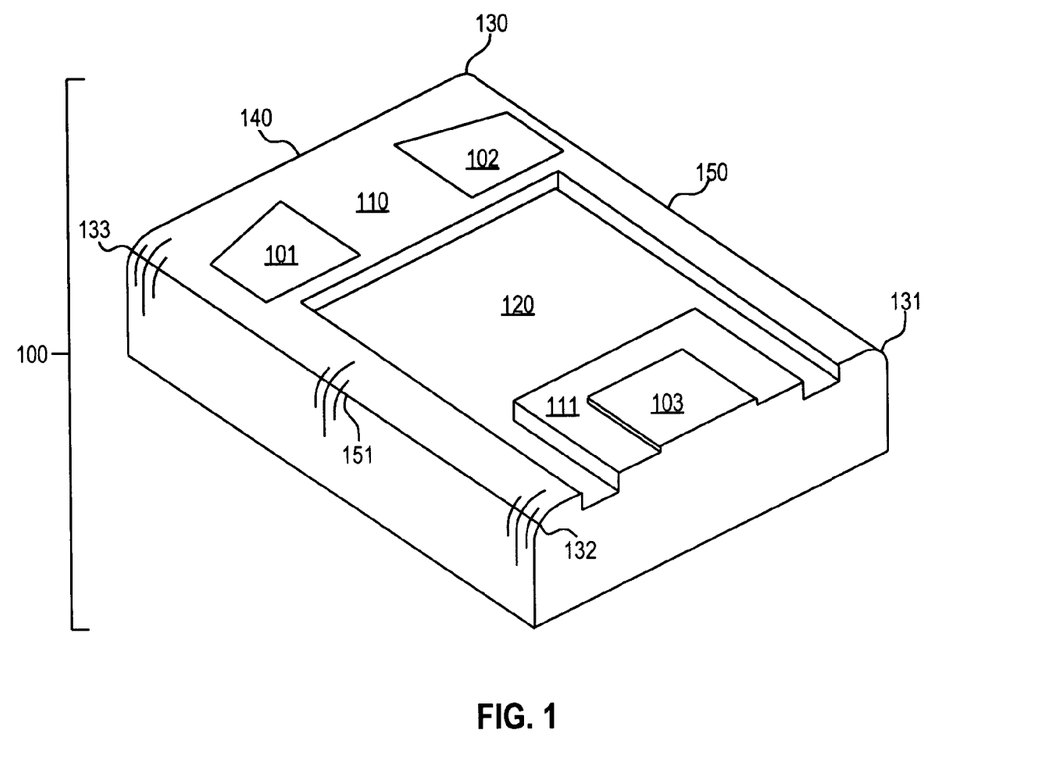
FIG. 1 schematically illustrates a prior art slider having rounded corners and edges.

Generally, the invention relates a stable encapsulant fluid that undergoes Diels-Alder polymerization reaction and that is useful for forming planarized slider assemblies and for patterning air-bearing slider surfaces. In order to elucidate the invention fully, a known slider is illustrated in FIG. 1. As with all figures referenced herein, in which like parts are referenced by like numerals, FIG. 1 is not to scale, and certain dimensions may be exaggerated for clarity of presentation. A slider 100 having a generally rectangular air-bearing surface is depicted in FIG. 1. Located on the air-bearing surface of slider 100 are leading pads 101 and 102 disposed on a first shallow step region 110. Additionally, the slider 100 includes a trailing pad 103 disposed on a second shallow step region 111. The shallow step regions 110 and 111 are approximately the same depth with respect to the air-bearing surface.

The shallow step region 110 extends along the leading edge 140 of slider 100 and has side rails that extend along the side edges 150 and 151 of slider 100. The shallow step regions 110 and 111 provide the positive pressure regions of slider 100. More specifically, the shallow step region 110 pressurizes leading pads 101 and 102 and shallow step region 111 pressurizes trailing pad 103 during operation, to give slider 100 a positive lift. Pressurization mainly occurs at the step transition between the shallow step regions and the air-bearing pads. The negative pressure region 120 is responsible for pulling slider 100 towards the disk surface during operation. During operation, the disk is rotating and the slider is flying above the disk surface. In general, the negative and positive pressure regions of slider 100 are counterbalanced to provide a relatively flat flying height profile.

It should be evident from the slider depicted in FIG. 1 that the steps on the air-bearing surface are patterned with sufficient precision to provide a desired flying height profile. Although the size of the sliders may vary, recent advances in slider processing technology allow for the production of sliders having a rectangular air-bearing surface area on the order of 1 $mm^2$ or less. Accordingly, there is an increasing demand for technologies that effect precise control over the placement and spatial orientation of slider surfaces when the surface is patterned.

To this end, the invention may be used to form a slider assembly comprising a plurality of sliders. The sliders are bonded by a debondable solid encapsulant formed from a Diels-Alder polymerization reaction. The sliders may composed of any material suitable for use as a slider having appropriate thermal, electrical, magnetic and mechanical properties. Typically, sliders for magnetic heads are made from a hard material having a high modulus of elasticity. Such materials include ceramics such as carbides, nitrides, and oxides. Carbides such as aluminum carbide, silicon carbide, titanium carbide, boron carbide, geranium carbide, tungsten carbide, and mixed-metal carbides (e.g., AlTiC or $Al_2O_3TiC$) are generally preferred but other materials such as titanium oxide, silicon nitride and silicon may be used as well. In addition, it is preferred that the slider is sized to require only minimal material addition or removal in order to pattern the air-bearing surface.

Thus, sliders may be formed by first cutting a monolithic solid member into the plurality of sliders. The monolithic solid member may be grown or prepared in bulk, and depending on desired properties, the material may have a single crystalline, multicrystalline, or amorphous microstructure. Exemplary techniques for forming monolithic materials include Czochralski, float zone and other methods known in the art.

Irrespective of the encapsulant employed to form the slider assembly, each slider of the assembly has a surface that is free from the encapsulant. These surfaces are coplanar to each other and typically represent air-bearing surfaces of the sliders. The coplanar arrangement of the slider surfaces is well suited for use in numerous surface-patterning techniques such as those involving the use of masking technology and/or the employment of photolithographic techniques. In some instances, the slider assembly has a contiguous or a substantially planar surface comprised of at least one encapsulant region and containing the coplanar slider surfaces. Such planar surface contiguity facilitates the deposition of a uniform and/or contiguous film or coating on the coplanar slider surfaces. Thus, any steps that may be present between an encapsulant region and the slider surfaces should be no more than that which would disrupt the deposition of a uniform coating on the coplanar slider surface. Typically, such steps are no more than about 5 micrometers in height to provide a high planarization value.

In some instances, the slider has an additional planar surface opposing the coplanar sliders surfaces. The additional planar surface may or may not be contiguous and may be formed from the encapsulant and/or a slider. Such an additional planar surface may further facilitate ease in the handling of the assembly.

In certain embodiments, the sliders of the assembly are substantially identical in geometric dimensions. In addition, the sliders are typically arranged in an array such that the distance between the sliders is minimized without having the sliders contact each other. Contact among the sliders increases the likelihood of slider damage. Often, rectilinear arrays are chosen to maximize the slider to encapsulant volumetric ratio.

The slider assembly may be used as a convenient means for handling and processing a plurality of sliders. To ensure that the sliders remain immobilized with respect to each other, the encapsulant may be rigid. To provide acceptable rigidity, the glass transition temperature of the encapsulant, Tg, is typically high. In addition or in the alternative, the slider assembly as described above may further include a carrier attached to the encapsulant and/or at least one slider. The carrier is particularly useful when the encapsulant is brittle or otherwise difficult to handle. Usually, the carrier does not cover any of the coplanar slider surfaces.

The encapsulant may be selected for certain properties that will facilitate its use in slider patterning techniques. While specific materials suitable for use as an encapsulant are discussed below, encapsulant materials generally share some common characteristics. As an initial matter, the encapsulant should be able to bond with the sliders in a void-free manner without debonding until after the patterning processes have been completed. Because bonding behavior is often surface dependent, the encapsulant should be selected according to the surface to which bonding is to take place. Particular attention should be paid to factors such as surface composition, morphology, and the like.

In addition, the encapsulant should be able to maintain its mechanical and dimensional stability until debonding is desired. For example, the encapsulant preferably exhibits minimal or no shrinkage and/or swelling until debonding is desired. Furthermore, the encapsulant preferably is readily debondable without damage to the sliders and without leaving any residue on the sliders. For example, the encapsulant may be debonded through washing in a solvent capable of solvating the encapsulant or a component thereof. In addition, or in the alterative, heat may be applied to liquefy, vaporize and/or discompose the encapsulant.

Thus, it should be evident that the encapsulant should be able to withstand the environmental conditions imposed on the sliders during patterning. For example, some slider patterning techniques require the exposure of sliders to a vacuum. Any outgassing from the encapsulant may compromise the quality of the vacuum. Thus, it is sometimes preferred that the encapsulant does not substantially outgas under vacuum. As another example, slider-patterning techniques may require thermal cycling of the sliders. Accordingly, it is preferred that the encapsulant be mechanically stable for thermal cycling, e.g., from about 20° C. to about 100° C.

Method for Forming a Slider Assembly

The invention provides a method for forming a slider assembly. The method involves arranging a plurality of sliders each having a surface such that the surfaces are coplanar to each other. An encapsulant fluid is dispensed in a manner effective to bond the sliders without contacting the coplanar slider surfaces. The dispensed encapsulant fluid is subjected to conditions effective for the fluid to form a debondable solid encapsulant from the encapsulant fluid.

Here, the encapsulant fluid is comprised of a mixture of a diene-containing compound and a dienophilic compound, wherein at least one of the diene-containing and the dienophilic compounds is protected so that the compounds do not substantially react with reach other at room temperature. The encapsulant fluid is dispensed at a temperature, e.g., room temperature, that does not allow the diene and dienophilic compounds to react before filing the region(s) between sliders (as discussed below) and bonding the sliders. Once the encapsulant fluid is in place, the encapsulant fluid is heated to a temperature sufficient to effect Diels-Alder polymerization of the diene and dienophilic compounds to form the debondable solid encapsulant.

Due to the precision required for forming the slider assembly and the size associated with the sliders, manual slider placement is typically undesirable. Instead, automated and/or robotic means for positioning or arrange the sliders may be preferred. Selection of an appropriate means for positioning or arranging the sliders depends on the speed and accuracy required. In some instances, the sliders may be placed simultaneously. In other instances, the sliders may be successively placed. One of ordinary skill in the art will recognize that positioning means, may be constructed from, for example, motors, levers, pulleys, gears, a combination thereof, or other electromechanical or mechanical means.

In order to maintain the sliders in proper position and spatial orientation to allow for solidification of the encapsulant to occur, a means for immobilizing the sliders may be employed. For example, the sliders may be arranged on a substrate surface and immobilized thereon through mechanical action (e.g., clips, centripetal force), electrostatic attraction, magnetic forces, or other known immobilizing means. In some embodiments, the sliders may be temporarily immobilized on a substrate through the application or use of an adhesive on the substrate surface, e.g., pressure sensitive adhesives such as acrylics, natural rubbers, butyl rubbers, polyvinylethers, silicones, and mixtures thereof. As the performance of pressure adhesives may vary with temperature, an adhesive may be selected to exhibit improved performance at temperatures ranging from about 25° C. to 30° C. The pressure of application may range from about 10 lbs/cm$^2$ to 50 lbs/cm$^2$ and preferably is about 25 lbs/cm$^2$. To deter the adhesive from leaving residue on the slider, the adhesive should preferentially adhere to the substrate over the air-bearing surfaces.

As discussed above, the encapsulant fluid is dispensed in a manner effective to bond the sliders without contacting the coplanar slider surfaces. Thus, when the substrate surface is planar, the air-bearing surfaces of the sliders may be placed in contact with the substrate surface to ensure that the air-bearing surfaces remain coplanar as well as to deter contact with the encapsulant fluid. Any adhesive used should be resistant or impervious to solvation by the encapsulant fluid or a component thereof to deter wicking of the encapsulant fluid via the adhesive to contact the slider surfaces.

The substrate may be comprised of any material compatible with the encapsulant fluid. In addition, the substrate is preferably selected from a material that is softer than the slider to avoid damaging any slider surface that comes into contact therewith. In some instances, a flexible substrate may be used to facilitate its removal. For example, any number of polymeric films may be used such as those derived from monomers including ethylene, propylene, butylene and, homopolymers and copolymers of these olefins; vinyl monomers such as vinyl acetate, vinyl chloride, vinylidene chloride, vinyl fluoride, acrylonitrile, methyl methacrylate and mixtures thereof; of ethylene with portions of one or more unsaturated monomers such as vinyl acetate, acrylic acid and acrylic esters; as well as styrenes, carbonates, esters and urethanes. Polymers capable of withstanding relatively high temperatures, such as polyimide may be a desirable substrate material when the substrate may be exposed to a high temperature. Polyimides are commercially available, e.g., under the tradename Kapton®, from DuPont (Wilmington, Del.).

Thus, it should be apparent that the substrate may be a laminate of a flexible tape and an adhesive, wherein the adhesive is in contact with the air-bearing surfaces. Exemplary adhesive thicknesses may range from about 2 to about 25 micrometers and the tape thickness may range from about 12 to about 150 micrometers.

The adhesive strength of the adhesive film varies from about 50 gm/20 mm up to about 100 gm/20 mm. Commercially available adhesive films include V-8-S from Nitto Denko, which is a polyvinyl chloride based tape having a 10 micrometer thick adhesive layer, a 70 micrometer thick polyvinyl chloride flexible substrate and 100 g/20 mm of adhesion. Another film is the Nitto Denko V-8-T, having the same composition as the V-8-S film with 50 gm/mm of adhesion.

Other useful films include Nitto Denko's BT-150E-EL film having 75 gm/20 mm of adhesion, an ethylene vinyl acetate based tape having a 15 micrometer thick adhesive layer; Lintec's Adwill P-1 600 B film, which is a water flushable tape having a base material of polyolefin which is 110 micrometers thick, an adhesive layer of polyacrylate which is 20 micrometers thick and has adhesion of 140 gm/25 mm. In some instances, polyesters such as polyethylene terephthalate may be used as a tape material. For example, substrates comprised of a laminate of a polyethylene terephthalate tape having a thickness of about 37 micrometers and an adhesive layer of about 5 micrometers are available from 3M Corporation (St. Paul, Minn.).

As discussed above, the sliders are typically arranged in a rectilinear array on a planar substrate surface such that the distance between the sliders is minimized without having the sliders contact each other. As a result, gaps or recesses are formed between the rows and columns. The distance between the rows and columns may range from about 50 to about 1000 micrometers and can be as small as about 100 micrometers or less. The depth of the gaps depends upon the thicknesses of the sliders and may range from about 100 to about 300 micrometers. While the encapsulant fluid may be dispensed in any manner effective to bond the sliders without contacting the coplanar slider surfaces, encapsulant fluid should flow in certain ways to form certain embodiments of the slider assembly. For example, in order to form void-free slider assemblies, encapsulant fluid is preferably injected or drawn into the gaps or recesses between the rows and the columns. In addition, to form slider assemblies having a contiguous planar surface comprised of at least one encapsulant region and containing the coplanar slider surfaces, the encapsulant fluid preferably conforms to the slider surfaces and the planar substrate surface to which the fluid comes into contact. Furthermore by bringing the level of encapsulant fluid to the same or higher level as the sliders, an additional planar surface opposing the coplanar sliders surfaces may be formed. Molds and equivalents thereof may be advantageously used to confine encapsulant fluid flow.

The ability of the encapsulant fluid to gap-fill is dependent on a number of factors. One particularly important factor is the viscosity of the encapsulant fluid. Viscosity is a measure of resistance of a fluid to sheer forces and is often roughly inversely proportional to the gap-filling ability of the fluid. Typically, the encapsulant fluid has a low initial viscosity, e.g., less than about 1000 centistokes. Preferably, the initial viscosity is no more than about 800 centistokes. More preferably, the initial viscosity is no more than about 500 centistokes. For certain encapsulant fluids, an initial viscosity of about 20 to about 200 centistokes represents an optimal range for gap-filling ability. For encapsulant fluids that contain a solvent, a higher solvent content tends to correlate with lower viscosity. In some instances, an encapsulant fluid containing a polymer dissolved in a solvent exhibits a preferred viscosity at a solvent content of 30 wt % to about 50 wt %. An optimal viscosity may sometimes be found when the solvent is present in a range of about 40 wt % to about 45 wt % of the encapsulation fluid.

Surface forces may also play a role in determining the ability of the encapsulant fluid to gap-fill. In general, the ability of an encapsulant fluid to fill a gap will depend, in part, on the affinity of the surface of the gap to the encapsulant fluid. Thus, proper selection of the encapsulant fluid according to the surface properties of the substrate and/or the sliders may enhance gap filling via capillary action.

Once proper distribution of the encapsulant fluid is achieved, the dispensed encapsulant fluid is subjected to conditions effective for the fluid to form a debondable solid encapsulant from the encapsulant fluid. Depending on the encapsulant used, solidification may take place via a number of different mechanisms. In situ crosslinking and/or polymerization is effected in the encapsulant fluid via the Diels-Alder reaction of interest. Optionally, additional polymerization reactions may take place. Furthermore, when the encapsulation fluid contains an additional polymer dissolved in a solvent, formation of a solid encapsulant may involve removing the solvent. This may be achieved by subjecting the encapsulation fluid to heat or reduced pressure. Nevertheless, solventless encapsulant fluids are generally preferred over encapsulant fluids containing excessive solvents.

In some instances, a combination of mechanisms may be employed. For example, a slider assembly may be formed in the manner as discussed above wherein the encapsulation fluid is comprised of a first polymer, a solvent, a diene-containing compound, and a dienophilic compound. Once dispensed, the solvent is evaporated to form a debondable solid encapsulant comprising the first polymer and a second polymer prepared via Diels-Alder polymerization and/or crosslinking diene-containing and the dienophilic compounds from the encapsulation fluid.

An example of the above-described method for forming the assembly is illustrated in FIG. 2. FIGS. 2A and 2B depict the placement of sliders 10 in a four-by-four rectilinear array on a tape 12 having a substantially planar upper surface 14. The upper surface 14 of the tape has a coating of a pressure-sensitive adhesive 16 coated on an upper surface thereof. Each slider has an air-bearing surface 18 and an opposing back surface 20. The air-bearing surfaces 18 are placed facing downward to face the upper surface 14 of the tape and to contact the pressure sensitive adhesive 16.

Figure 2A:
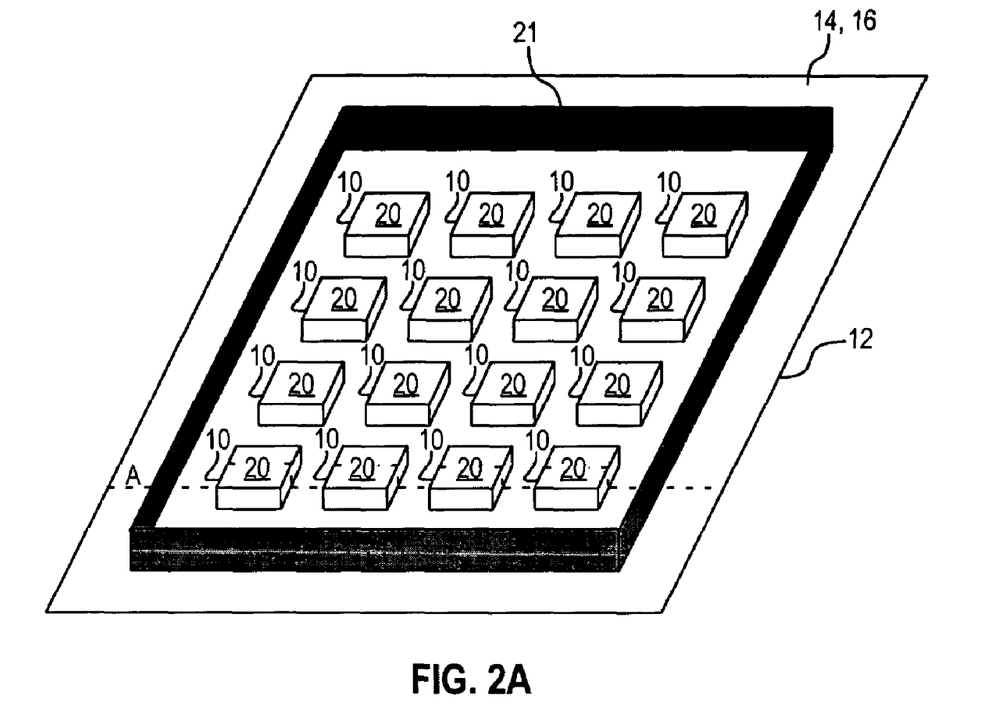
Figure 2B:
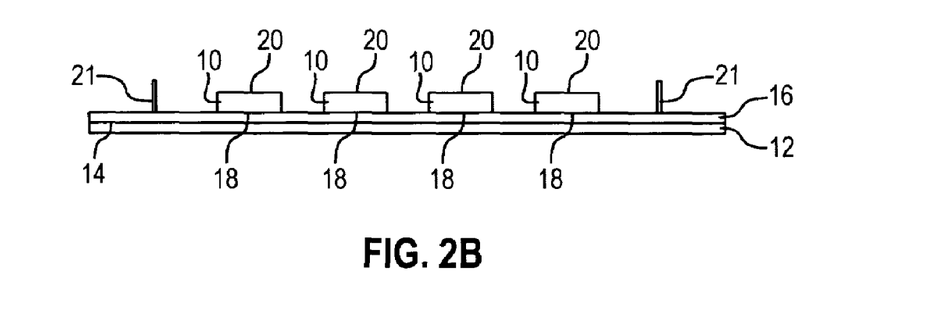
FIG. 2B depicts the arrangement of sliders of FIG. 2A in cross-sectional view along dotted line A.

Also provided is a rectangular frame 21 in contact with the pressure sensitive adhesive 16. Together with the frame 21, the tape 12 serves as a mold or container to confine the encapsulant fluid dispensed thereon.

Figure 2C:
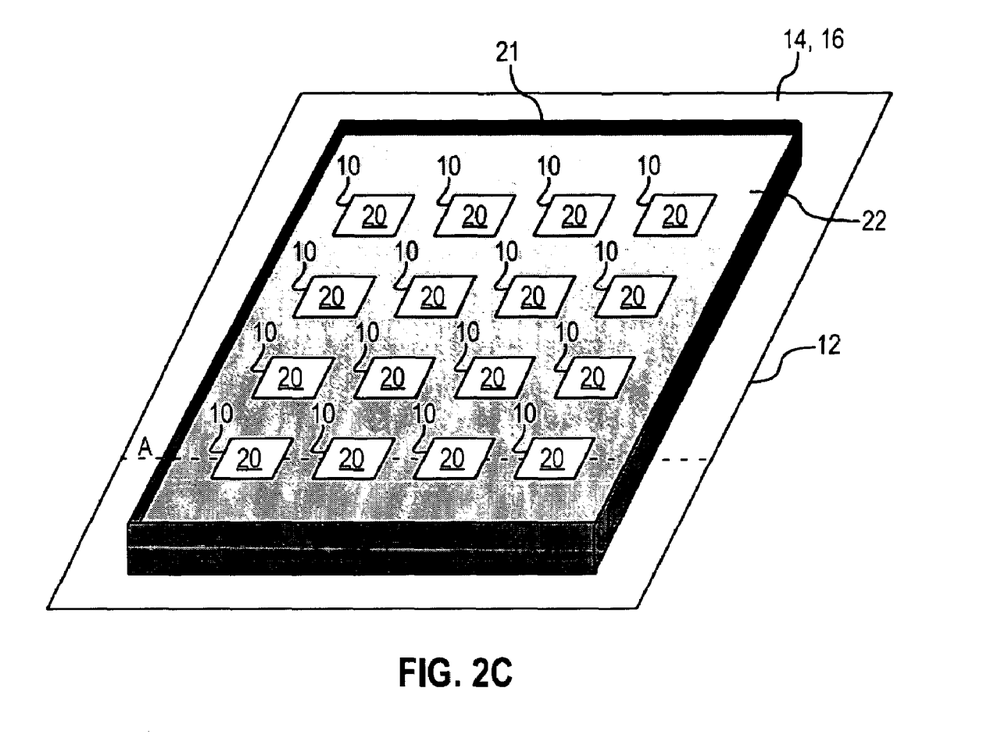
FIGS. 2C and 2D depict the formation of an encapsulated array in top and cross-sectional views, respectively.
Figure 2D:
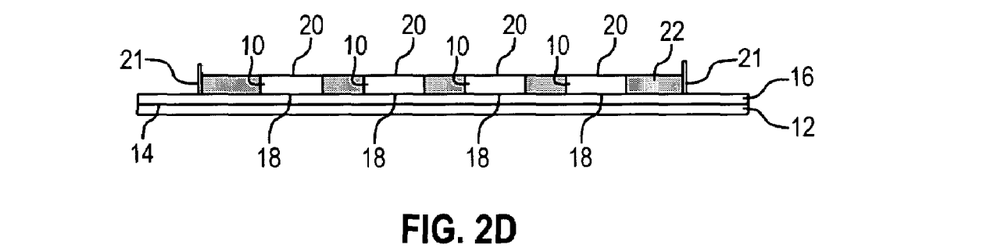

FIGS. 2C and 2D depict the formation of an encapsulated array. In general, FIGS. 2C and 2D are identical to FIGS. 2A and 2B, except that an encapsulant fluid 22 is dispensed on the tape 12 within the frame 21 to a level that coincides with the exposed surface 20 of the sliders 10. As depicted in FIG. 2D, the encapsulant fluid conforms to the sides of the sliders 10 as well as the profile of the upper surface 14 of the tape. In addition, no wicking of the encapsulant fluid 22 is shown between air-bearing surfaces 18 of the sliders 10 and the adhesive 16.

Figure 2E:
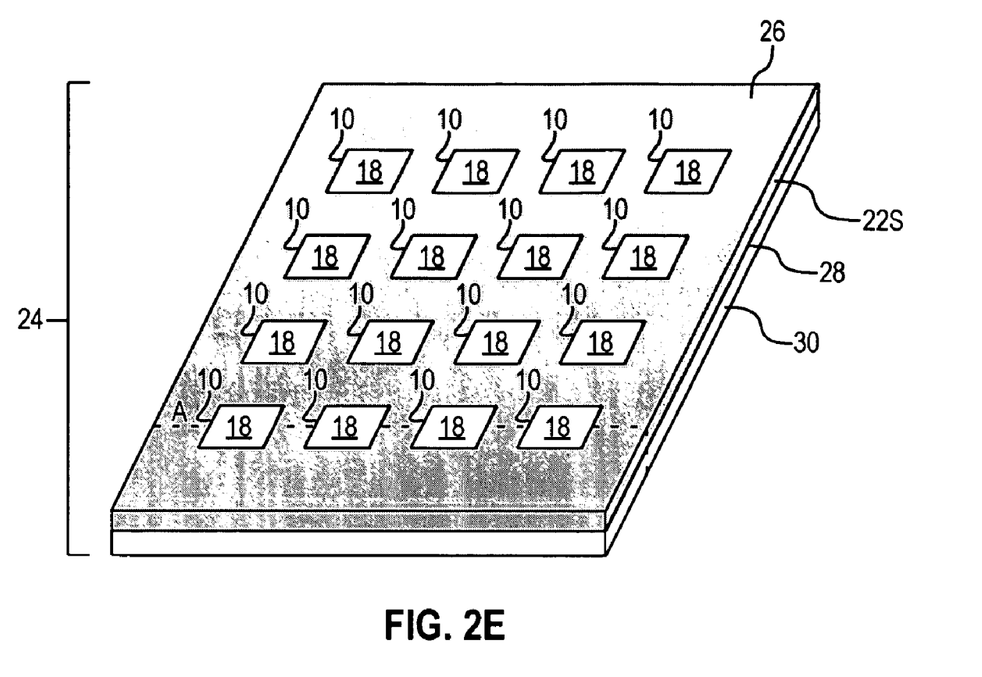
FIGS. 2E and 2F depict the encapsulated array of FIGS. 2C and 2D attached to a carrier and having the tape removed in top and cross-sectional views, respectively.
Figure 2F:
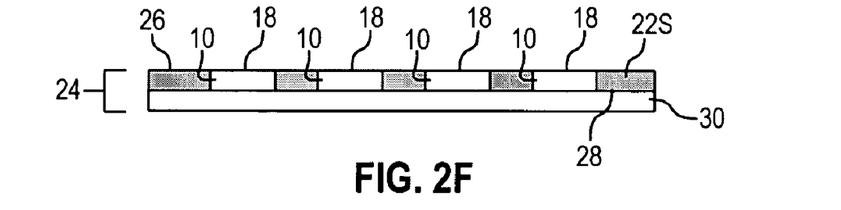

As depicted in FIGS. 2E and 2F, once the encapsulant fluid 22 solidifies to form the encapsulant 22S, the tape 12 may be removed to form the slider assembly 24. The slider assembly 24 has two opposing parallel planar surfaces indicated at 26 and 28. Surface 26 is formed in part by air-bearing surfaces 18 of the sliders 10, while surface 28 is formed in part by the back surfaces 20 of the sliders 10. A carrier 30 is attached to surface 28.

Method for Patterning an Air-Bearing Surface of a Slider

The invention further provides a method for patterning an air-bearing surface of a slider. The method involves applying a resist layer on an air-bearing surface of a slider, wherein at least a portion of the slider other than the air-bearing surface is encapsulated in a solid encapsulant as described herein. A portion of the resist layer is removed to uncover a portion of the air-bearing surface in a patternwise manner. In some instances, material is added to the uncovered portion of the air-bearing surface. In addition or in the alternative, material may be removed from the uncovered portion of the air-bearing surface. As a result, the air-bearing surface is patterned. Notably, the encapsulant is mechanically stable upon exposure to any fluid employed to apply the resist layer, to remove the resist layer, to add material to the air-bearing surface and/or to remove material from the air-bearing surface.

In general, the resist layer may be applied using any of a number of conventional techniques, e.g., sequential spin coating, casting, extruding or the like. For example, a resist composition may be provided in a liquid solvent on the substrate surface, and heated to remove the solvent. As a result, the resist layer typically has a thickness of about 1 to about 20 micrometers, optionally about 2 to about 10 micrometers. To effect controlled removal of portions of the resist layer, it is preferred that the resist layer be applied with a uniform thickness.

To facilitate the patternwise removal of a portion of the resist layer, the resist layer may be comprised of a photosensitive composition that has been exposed to photons in the patternwise manner. Photosensitive compositions are typically polymeric and exhibit different removal properties after exposure to electromagnetic radiation. For example, photosensitive compositions may exhibit increased mechanical integrity resulting from radiation-initiated crosslinking, or decreased mechanical integrity resulting from radiation-initiated breakdown. Examples of photosensitive compositions include, but are not limited to, positive and negative resists that are responsive to photon or electron beams. Positive photoresist compositions are more easily removed after exposure to radiation. Positive photoresists may include polymeric materials with weak links that degrade by the process of scission or contain a photoactive component that renders the composition more soluble to a solvent upon irradiation. Negative photoresist compositions, on the other hand, become more difficult to remove after exposure to radiation.

Suitable photosensitive compositions such as photoresists may comprise, for example, poly(methyl methacrylate) ("PMMA") or copolymers thereof such as poly(methyl methacrylate-co-t-butylmethacrylate), a poly(lactide) such as poly(lactide-co-glycolide), polymethacrylamide, polyoxymethylene, polyalkenesulfone, or poly(glycidylmethacrylate-co-ethyl acrylate), epoxies, phenolics, polymers thereof, copolymers thereof, and combinations thereof. Photosensitive compositions may also contain photoactive compounds including, but not limited to, diazonaphthoquinones, iodonium and sulfonium salts and o-nitrobenzyl esters.

Typically, the resist is irradiated using photonic radiation, e.g., ultraviolet radiation and a mask to provide the desired pattern. Following exposure, the resist layer may be developed using a suitable solvent to remove the irradiated or the non-irradiated areas to uncover a portion of each slider surface. One of ordinary skill in the art will recognize that there are many commercially available photoresists having different exposure wavelengths, and that custom photoresist compositions may be formulated to have a particular exposure wavelength.

When one wishes to add material to the uncovered portion of the air-bearing surface, various techniques are known in the art of semiconductor fabrication. Exemplary techniques include, but are not limited to, evaporation, sputtering, chemical vapor deposition, and electroplating. Notably, deposition techniques must be chosen according to the material. For example, metals may be deposited by evaporation, sputtering, electroplating, chemical vapor deposition, etc.

In order to effect a high degree of control over the addition of material to the air-bearing surface, vacuum deposition technology is generally preferred. Such vacuum processes include, but are not limited to, cathodic arc physical vapor deposition, electron-beam evaporation, enhanced arc physical vapor deposition, chemical vapor deposition, magnetronic sputtering, molecular beam epitaxy, combinations of such techniques and a variety of other techniques known to one of ordinary skill in the art.

When one wishes to remove material from the air-bearing surface, an etchant may be used to effect chemical, mechanical and/or physical removal material. In some instances, an isotropic etchant may be used to remove material in a direction-invariant manner such that no difference is exhibited in directional etching rate. Alternatively, an anisotropic etchant may be used to remove material preferentially in a particular direction, e.g., according to crystallographic orientation of the solid body or the direction of the light energy particles for light assisted etching. In some instances, an ionized gas such as argon-based or fluorine-based plasma or an ion beam may be used as an etchant. A liquid etchant may also be advantageously used as well.

Further information regarding patterning and etching processes using lithographic techniques is provided in Sze (1983), "Lithography," VSLI Technology, McGraw-Hill Book Company.

Thus, it should be apparent that encapsulant may be mechanically stable upon exposure to a variety of fluids employed to pattern the slider surface. For example, any fluids associated with the application, development, and/or removal of a resist layer. Such fluids may comprise organic and/or inorganic compounds and may be acidic, basic, oxidizing, or reducing in nature. In addition, aqueous and/or nonaqueous fluids may be used as well.

FIG. 3 depicts an example of the above-described method for patterning an air-bearing surface of a plurality of sliders provided in the form of the slider assembly depicted in FIG. 2. As shown in FIG. 3A, the slider assembly 24 is placed on a flat surface such that the air-bearing surface 28 of the assembly faces upward and the carrier 30 contacts the flat surface. A photoresist layer 32 is applied in a uniform thickness over the air-bearing surface. Due to the planarization of air-bearing surface 28, the resist layer may be applied as a thin, high-resolution coating. Planarized surfaces have been coated with resist layers having a preferred thickness of about 1 to 25 micrometers and a more preferred thickness of about 2.0 to 15 micrometers. This provides a resolution of about 200 micrometers to 5 micrometers.

Figure 3A:
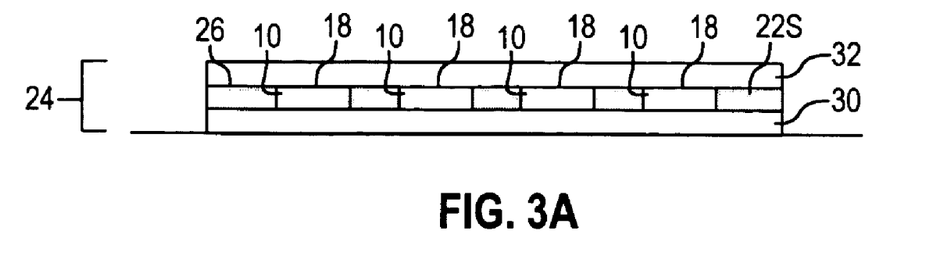
FIG. 3A depicts in cross-sectional view the application of a photoresist layer on the air-bearing surface of the slider assembly.
Figure 3B:
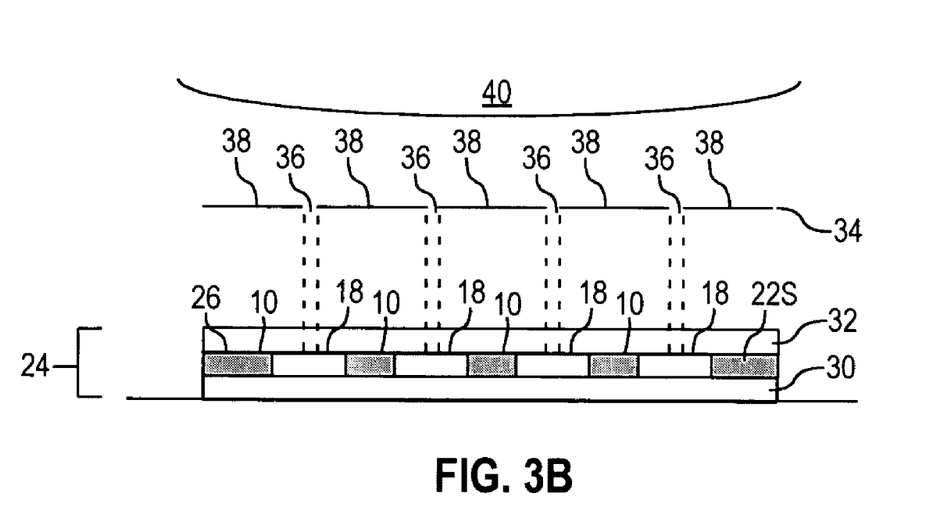
FIG. 3B depicts in cross-sectional view the patternwise exposure of the photoresist layer.

FIG. 3B depicts the patternwise exposure of the photoresist layer 32 to photons. This is performed by providing a mask 34 having transparent regions 36 and opaque regions 38. A source 40 of photons is provided in order to generate radiation, preferably substantially collimated, having a wavelength to which the photoresist layer 32 is responsive. Typically, the wavelength is an ultraviolet wavelength. The mask 34 is placed between the photon source 40 and the photoresist layer 32 such that the transparent regions 36 are in alignment with the air-bearing surfaces 1° of the sliders 10. As a result, radiation is transmitted through the transparent regions 36 of the mask 34, and the photoresist layer is converted into a patterned layer comprising the exposed and the unexposed regions. In some instances, grayscale masks are employed.

Figure 3C:
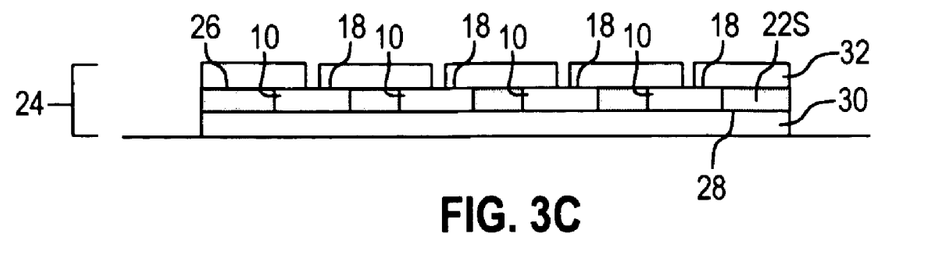
FIG. 3C depicts in cross-sectional view the removal of the resist layer according to the pattern formed in FIG. 3B.

FIG. 3C depicts the removal of a resist layer according to the pattern formed in FIG. 3B. This is achieved by developing the exposed portions of the photoresist layer 32 to facilitate removal thereof. In this case, the exposed portions are washed away with a solvent, leaving the unexposed portions intact. As a result, portions of the air-bearing surfaces 18 are uncovered.

Figure 3D:
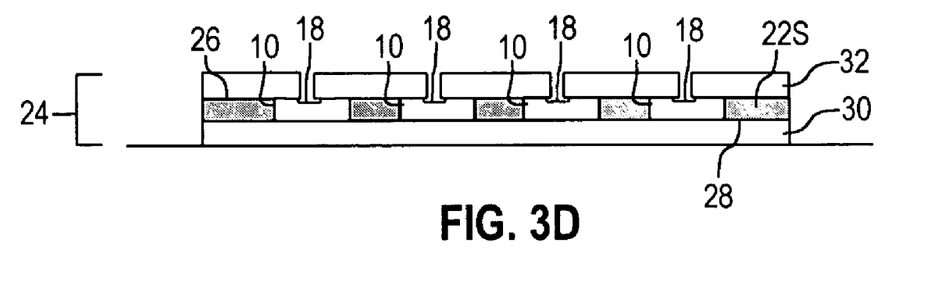
FIG. 3D depicts in cross-sectional view the removal of material from the exposed slider surfaces.
Figure 3E:
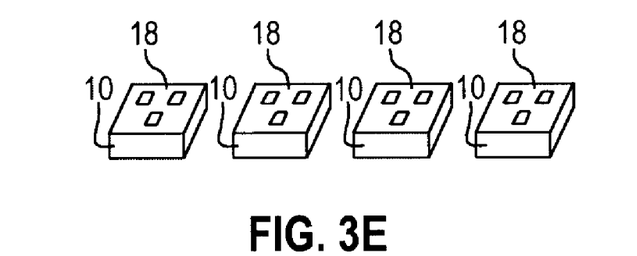
FIG. 3E depicts in top view debonded sliders having patterned air-bearing surfaces.

FIG. 3D depicts the removal of material from the uncovered slider surfaces 18 by exposing the surfaces 18 to an etchant. By debonding the encapsulant 22S from the sliders, as depicted in FIG. 3E, encapsulant free sliders 10, having patterned air-bearing surfaces 18, are formed. As discussed above, debonding may involve using a solvent to wash away the encapsulant or applying heat to liquefy, vaporize and/or discompose the encapsulant. Mechanical action may also be used sparingly to assist in the debonding process. For example, soft brushes may be used in conjunction with a solvent to remove encapsulant from the sliders so that no residue is left behind.

Encapsulant Fluids and Debondable Encapsulants

The selection of encapsulant fluids and debondable encapsulants represents a particularly important aspect of the invention. As discussed above, the encapsulant fluids are selected for their ability to gap-fill and to form slider arrays having high planarization values. However, encapsulant fluids having a desirable gap-filling capability tend to form encapsulants having poor debonding performance. Thus, while a number of encapsulant materials have been investigated, only a relative few have been found to exhibit both excellent gap-filling capabilities and bonding/debonding performance.

Specifically, the invention provides novel Diels-Alder polymers or monomer mixtures having an indefinite shelf life as debondable encapsulant materials. When used in the slider processes described above, the polymers function as solid encapsulant/planarization materials which are chemically and dimensionally stable to subsequent processing steps, e.g., those involving photoresist application and/or etching. The encapsulant can be removed at elevated temperatures. Optionally, a solvent may be be employed in conjunction with heating to promote debonding.

As discussed above, both a diene and dienophile are required to carry out a Diels-Alder reaction make an adduct cross-linked material. The reaction is generally thermally reversible at mild temperatures when appropriate dienes and dienophiles are used. The rate of reaction between a diene and dienophile is generally determined by the diene and dienophile used. Likewise, the rate of the retro-Diels-Alder reaction (for depolymerization) is also determined by the individual components and the substituents on them. Typically, upon heating, equilibrium between adduct, and dienophile/diene shifts toward an increase in the amount of the diene and dienophile.

For example, the following illustrates a reversible Diels-Alder reaction of a maleimide, the dienophile, with functional group R, and a furan, the diene, with functional group R'.

For this reaction, any organic functional group can be used for R or R' where the functional group does not undergo a preferential Diels-Alder reaction.

The diene-containing compounds suitable for the invention may contain one or more cyclic groups, e.g., furan groups such as those in bis(furan), tris(furan) or tetrakis (furan). In some instances, the diene-containing compound may contain silicon.

One important aspect of the invention pertains to the stability of the encapsulant fluid at room temperature. Known Diels-Alder mixtures containing only unprotected reactants suffer generally from poor shelf life. The unprotected reactants have been found to react to a degree such that their viscosity cannot be controlled. When the viscosity of an encapsulant fluid is too high, the fluid cannot fulfill the capillary fill requirement associated with the formation of slider assemblies. In addition, uncontrolled changes in viscosity tend to yield irreproducible results. In contrast, the reactants of the inventive encapsulant fluid of the invention are protected. As a result, the inventive encapsulant fluid's low viscosity is maintained indefinitely at room temperature, thereby avoiding the drawbacks associated with fluid mixtures whose viscosities change sufficiently rapidly so as to compromise the the mixtures' gap filling ability.

Either or both of the diene-containing and dienophilic compounds are protected. For example, the diene-containing compound may be protected by a protecting moiety such as butadiene or isoprene, and the dienophilic compound may be protected by a capping monofuranic moiety. By protecting the diene and/or the dienophile, the encapsulant fluid will be sufficiently stable such that the viscosity of encapsulant fluid does not substantially change for at least 24 hours at room temperature. Preferably, the viscosity of encapsulant fluid does not substantially change for at least 7 days at room temperature.

For example, the encapsulant fluid may be formed from a mixture of a tris(furan) material and a bis(maleimide) material, which has been stabilized by reaction with a monofuranic moiety, as follows.

The monofuranic moiety serves to react with all maleimide groups leading to a stable resin. The molecular weight and viscosity of the malimide material can be controlled by the initial reaction time and the nature of the monofuranic compound. In the absence of the monofuranic compound, a continuously reacting system at room temperature is obtained which forms a crosslinked gel in about 3-6 hours.

The monofuranic stabilized materials may be converted to the desired crosslinked networks. When heated to elevated temperatures, the monofuranic compound is volatilized and leaves the matrix to result in an unaltered tris(furan) material, a deprotected bis(maleimide), and a monofuranic compound, as follows.

On cooling, the desired Diels-Alder chemistry occurs and a solid encapsulant comprised of the following crosslinked matrix is obtained.

The mechanical, chemical, and dimensional stability of the polymeric encapsulant materials is usually associated with the fact that the encapsulant is comprised of a highly crosslinked polymeric material. Crosslinking can be achieved in a number of ways. Typically, a polymeric or oligomeric material can have pendent groups that are linked together directly or with the help of other linking agents. Other methods for generating networks are also known in the art. Such encapsulant fluids have been demonstrated to form solid polymeric encapsulants that display exceptional performance during the slider processing techniques described above with only minor loss in step height and registration.

The debondability of the encapsulant derives from the reversibility of the Diels-Alder reaction. At elevated temperatures, a retro-Diels-Alder reaction occurs to convert the crosslinked network to monomers and/or oligomers. In particular, hot solvents may serve to solvate the monomeric and/or oligomeric fragments, thereby facilitating their removal from patterned and fabricated single sliders. It has been found that heating an exemplary network at 120° C. in N-methylpyrrolidone results in little or no detectable residue. Other solvents, e.g., polar solvents such as N,N-dimethylacetamide, methyl sulfoxide (DMSO), N,N-dimethylformamide (DMF), and propylene glycol methyl ether acetate and N-methylpyrrolidinone, may also facilitate encapsulant removal.

Variations of the present invention will be apparent to those of ordinary skill in the art. For example, use of small discrete monomers may result in crosslinked networks having a wide range of properties and associated curing and depolymerization temperatures. In addition, it should be noted that the bonding and debonding performance of an encapsulant is dependent on a variety of factors and is not generally predictable based solely on the degree of crosslinking. While certain Diels-Alder polymers may exhibit acceptable bonding and debonding performance, others may not. For example, while the particular exemplary Diels-Alder polymers discussed above have generally been found to exhibit acceptable bonding/debonding performance, it is expected that not all Diels-Alder polymers can be used to form a debondable encapsulant. Accordingly, employment of such unsuitable polymers in an encapsulant is not encompassed by the invention. In addition, the Diels-Alders reactions described in U.S. Pat. No. 6,271,335 to Small et al. and other patents may be adapted for use in conjunction with the invention if the dienes and/or dienophiles of such reactions are protected.

It is to be understood that while the invention has been described in conjunction with the preferred specific embodiments thereof, the foregoing description is intended to illustrate and not limit the scope of the invention. Other aspects, advantages and modifications will be apparent to those skilled in the art to which the invention pertains.

All patents, patent applications, and publications cited herein are incorporated by reference in their entireties.

We claim:

1. An encapsulant fluid, comprising a mixture of a diene-containing compound and a dienophilic compound, wherein at least one of the diene-containing and the dienophilic compounds is protected so that the compounds do not substantially react with each other at room temperature, and the diene-containing and the dienophilic compounds are capable of undergoing a reversible Diels-Alder polymerization reaction at a polymerization temperature above room temperature to form a solid debondable polymeric encapsulant.

2. The encapsulant fluid of claim 1, having a viscosity of no more than 800 centistokes.

3. The encapsulant fluid of claim 2, wherein the viscosity is no more than 500 centistokes.

4. The encapsulant fluid of claim 3, wherein the viscosity is 10 to 200 centistokes.

5. The encapsulant fluid of claim 1, wherein the diene-containing compound contains at least one cyclic group.

6. The encapsulant fluid of claim 5, wherein the cyclic group is a furan group.

7. The encapsulant fluid of claim 6, wherein the diene-containing compound contains a plurality of furan groups.

8. The encapsulant fluid of claim 7, wherein the diene-containing compound is a bis(furan), tris(furan) or tetrakis(furan).

9. The encapsulant fluid of claim 1, wherein the diene-containing compound contains silicon.

10. The encapsulant fluid of claim 1, wherein the dienophilic compound contains at least one maleimide group.

11. The encapsulant fluid of claim 10, wherein the dienophilic compound contains a plurality of maleimide groups.

12. The encapsulant fluid of claim 1, wherein the dienophilic compound is protected.

13. The encapsulant fluid of claim 12, wherein the dienophilic compound is protected by a capping furanic moiety.

14. The encapsulant fluid of claim 13, wherein the capping furanic moiety is a monofuranic moiety.

15. The encapsulant fluid of claim 1, wherein the diene-containing compound is protected.

16. The encapsulant fluid of claim 15, wherein the diene-containing compound is protected by a protecting moiety.

17. The encapsulant fluid of claim 16, wherein the protecting moiety is a butadiene or isoprene.

18. The encapsulant fluid of claim 1, wherein compounds exhibit sufficiently low reactivity such that the viscosity of encapsulant fluid does not substantially change for at least 24 hours at room temperature.

19. The encapsulant fluid of claim 18, wherein the viscosity of encapsulant fluid does not substantially change for at least 7 days at room temperature.

* * * * *